(12) United States Patent
Kurtz et al.

(10) Patent No.: US 6,700,473 B2
(45) Date of Patent: *Mar. 2, 2004

(54) PRESSURE TRANSDUCER EMPLOYING ON-CHIP RESISTOR COMPENSATION

(75) Inventors: Anthony D. Kurtz, Ridgewood, NJ (US); Andrew V. Bemis, Upper Saddle River, NJ (US); Joseph VanDeWeert, Cliffside Park, NJ (US)

(73) Assignee: Kulite Semiconductor Products, Inc., Leonia, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/503,678

(22) Filed: Feb. 14, 2000

(65) Prior Publication Data
US 2002/0086460 A1 Jul. 4, 2002

(51) Int. Cl.[7] ................................................. H01L 10/10
(52) U.S. Cl. ................................. 338/42; 338/7; 338/9; 73/862.623
(58) Field of Search .............................. 338/3, 7, 8, 9, 338/42; 73/708, 862.623

(56) References Cited

U.S. PATENT DOCUMENTS

| | | | | |
|---|---|---|---|---|
| 3,245,252 A | | 4/1966 | First et al. | |
| 4,226,899 A | * | 10/1980 | Thiel et al. | 427/101 |
| 4,414,837 A | | 11/1983 | Bice et al. | |
| 4,462,018 A | * | 7/1984 | Yang et al. | 338/3 |
| 4,480,478 A | * | 11/1984 | Sato | 73/708 |
| 4,510,813 A | * | 4/1985 | Kanazawa | 73/766 |
| 4,622,856 A | * | 11/1986 | Binder et al. | 338/9 |
| 4,628,296 A | * | 12/1986 | Kitagawa et al. | 338/3 |
| 4,777,826 A | * | 10/1988 | Rud, Jr. et al. | 73/708 |
| 4,788,521 A | * | 11/1988 | Johnson | 338/3 |
| 5,197,334 A | * | 3/1993 | Guziak | 73/708 |
| 5,286,671 A | | 2/1994 | Kurtz et al. | 437/64 |
| 5,549,006 A | * | 8/1996 | Kurtz | 73/708 |
| 5,877,423 A | * | 3/1999 | Mattsson | 73/708 |
| 6,097,276 A | * | 8/2000 | Van Den Broek et al. | 338/9 |

OTHER PUBLICATIONS

Webpage at www.precisionresistor.com, printed Oct. 1, 2003, date unknown.*

* cited by examiner

Primary Examiner—Karl D. Easthom
(74) Attorney, Agent, or Firm—Duane Morris LLP

(57) ABSTRACT

A dielectrically isolated temperature compensated pressure transducer including: a wafer including a deflectable diaphragm formed therein, the diaphragm being capable of deflecting in response to an applied pressure, and the diaphragm defining an active region surrounded by an inactive region of the wafer; a plurality of dielectrically isolated piezoresistive elements formed on the active region of the wafer and coupled together to form a Wheatstone bridge configuration so as to cooperatively provide an output signal in response to and indicative of an amount of deflection of the diaphragm, the plurality of piezoresistive elements being undesirably operative to introduce an undesirable error into the output according to exposure of the wafer to an environmental condition; and, a dielectrically isolated resistor formed on the inactive region of the wafer and electrically coupled in series to the plurality of piezoresistive elements so as to at least partially compensate for the undesirable error.

16 Claims, 5 Drawing Sheets

PRESSURE TRANSDUCER EMPLOYING ON-CHIP RESISTOR COMPENSATION

FIELD OF INVENTION

The present invention relates to piezoresistive pressure sensors and more particularly temperature compensated pressure transducers.

BACKGROUND OF INVENTION

It is well known in a piezoresistive Wheatstone bridge having four equal piezoresistors of resistance $R_B$ of which two increase with positive strain and two decrease with an equal negative strain, that the change of voltage $\Delta V$ across the bridge is given by:

$$\frac{\Delta V}{V_B} = \frac{\Delta R_B}{R_B}$$

and that $$\frac{\Delta R}{R} = \epsilon GF$$

where $\epsilon$ is the strain, $V_B$ is the voltage applied across the bridge and GF is the gauge factor. It is also well known that the gauge factor decreases as a function of bridge temperature. The rate of change of gauge factor with temperature is usually referred to as TCGF or temperature coefficient of gauge factor. Thus, for a constant voltage applied across the bridge, the output will decrease as a function of temperature. It is also well known that resistance of the bridge elements increase as a function of temperature. The change of resistance with temperature is referred to as TCR or temperature coefficient of resistance. For highly doped P-type silicon, the TCGF is approximately $-2\%/100°$ F. to $-3\%/100°$ F. while the TCR is approximately $+10\%/100°$ F. Referring now to FIG. 1, one way to make the output voltage more independent of temperature using a constant voltage source 15 is to place a temperature independent resistor $R_S$ in series with the bridge 2. Thus, as temperature increases the bridge resistance increases and more of the supply voltage appears across the bridge. For this case the bridge voltage $V_B$ is given by:

$$V_B = \frac{R_B}{R_B + R_S} V_0$$

Thus, by appropriate choice of the ratio of $R_S$ to $R_B$, the desired increase of bridge voltage with temperature can be obtained. This compensation scheme can be used in many applications. An example of such an apparatus and method is illustrated in U.S. Pat. No. 3,245,252, entitled "TEMPERATURE COMPENSATED SEMICONDUCTOR STRAIN GAGE UNIT" issued Apr. 12, 1966, the entire disclosure of which is hereby incorporated by reference as if being set forth herein in it entirety. However, there are some instances when such an approach is unsuitable for certain needs. An example of such an application is where certain extremely tight specifications are needed, then the passive resistor alone can not accomplish the desired effect. This is especially true when the pressure transducer must be extremely precise at either the extreme cold end or extreme hot end of the operating temperature range of the device.

It is an object of the present invention to provide an improved temperature compensated transducer suitable for use in these types of applications.

SUMMARY OF INVENTION

A dielectrically isolated temperature compensated pressure transducer including: a wafer including a deflectable diaphragm formed therein, the diaphragm being capable of deflecting in response to an applied pressure, and the diaphragm defining an active region surrounded by an inactive region of the wafer; a plurality of dielectrically isolated piezoresistive elements formed on the active region of the wafer and coupled together to form a Wheatstone bridge configuration so as to cooperatively provide an output signal in response to and indicative of an amount of deflection of the diaphragm, the plurality of piezoresistive elements being undesirably operative to introduce an undesirable error into the output according to exposure of the wafer to an environmental condition; and, a dielectrically isolated resistor formed on the inactive region of the wafer and electrically coupled in series to the plurality of piezoresistive elements so as to at least partially compensate for the undesirable error.

DETAILED DESCRIPTION OF THE INVENTION

According to the present invention, in order to fit these specifications it is necessary to adjust slightly the temperature variation of the bridge voltage such that it is easier to compensate the transducer.

Figure 1:
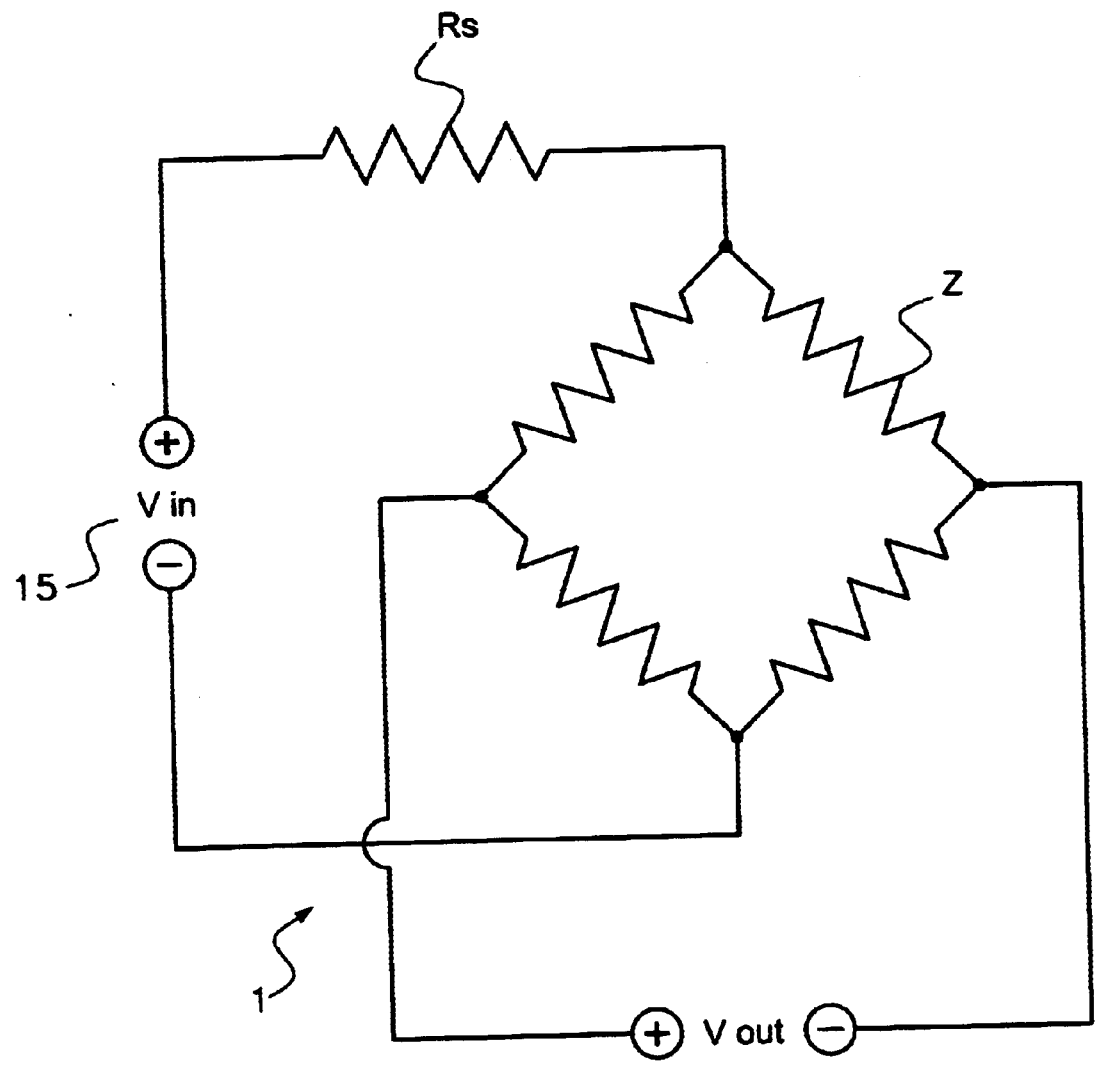
FIG. 1 illustrates a conventional temperature compensation including an output circuit which uses a single passive resistor in series with the piezoresistive bridge.

In FIG. 1 is shown a conventional temperature compensation circuit using a single, passive resistor $R_S$ in series with the piezoresistive Wheatstone bridge 2. According to the present invention, a resistor which has a substantially same temperature coefficient as the bridge elements, hereafter called the "on-chip resistor", is placed near an edge of the sensor wafer on the inactive portion of the sensor. More particularly, the TCR of the on-chip resistor is preferably substantially identical to that of each of the arms of the Wheatstone bridge 2. The on-chip resistor is shunted with a passive resistive element which is largely temperature independent. The on-chip resistor is placed in a region of minimum stress on the sensor so that it does not change resistance with pressure. Instead, it is intended to change solely with temperature in the same fashion that the other piezoresistive elements of the Wheatstone bridge 2 change. By shunting the on-chip resistor with a temperature independent fixed resistor having a TCR of substantially zero (meaning less than 1 ppm/degree C.), the TCR of the parallel combination can be adjusted depending upon the magnitude of the on-chip and shunt resistors. This is because a parallel combination of resistors with different TCRs will have a different combined TCR then each individual one. By varying the magnitudes of the on-chip and shunt resistors, a wide range of TCR resistances in series with the basic Wheatstone bridge 2 can be obtained. Thus, by adjusting the size of the on-chip and shunt resistor it is possible to produce a wide range of different adjustments to the increase of bridge voltage with temperature. The equation below shows how the output voltage is effected by all of the resistors:

$$\frac{V_{out}}{V_{in}} = \left(\frac{V_{out}}{V_{in}}\right)_{OLD} \frac{R_{bridge}(R_{shunt} + R_{OnChip})}{R_{shunt}R_{bridge} + R_{OnChip}R_{bridge} + R_{span}R_{shunt} + R_{span}R_{OnChip} + R_{shunt}R_{OnChip}}$$

It can be seen from this equation that by making $R_{OnChip}$ the same order of magnitude as the bridge resistance and by making $R_{shunt}$ much larger it is possible to make the term shown have a much different TCR then a bridge would have alone. If a greater effect is desired then a larger $R_{OnChip}$ can be used.

$$\left(\frac{V_{out}'}{V_{in}}\right)_{OLD}$$

being the pre-temperature compensated tranducer's sensitivity.

Figure 2:
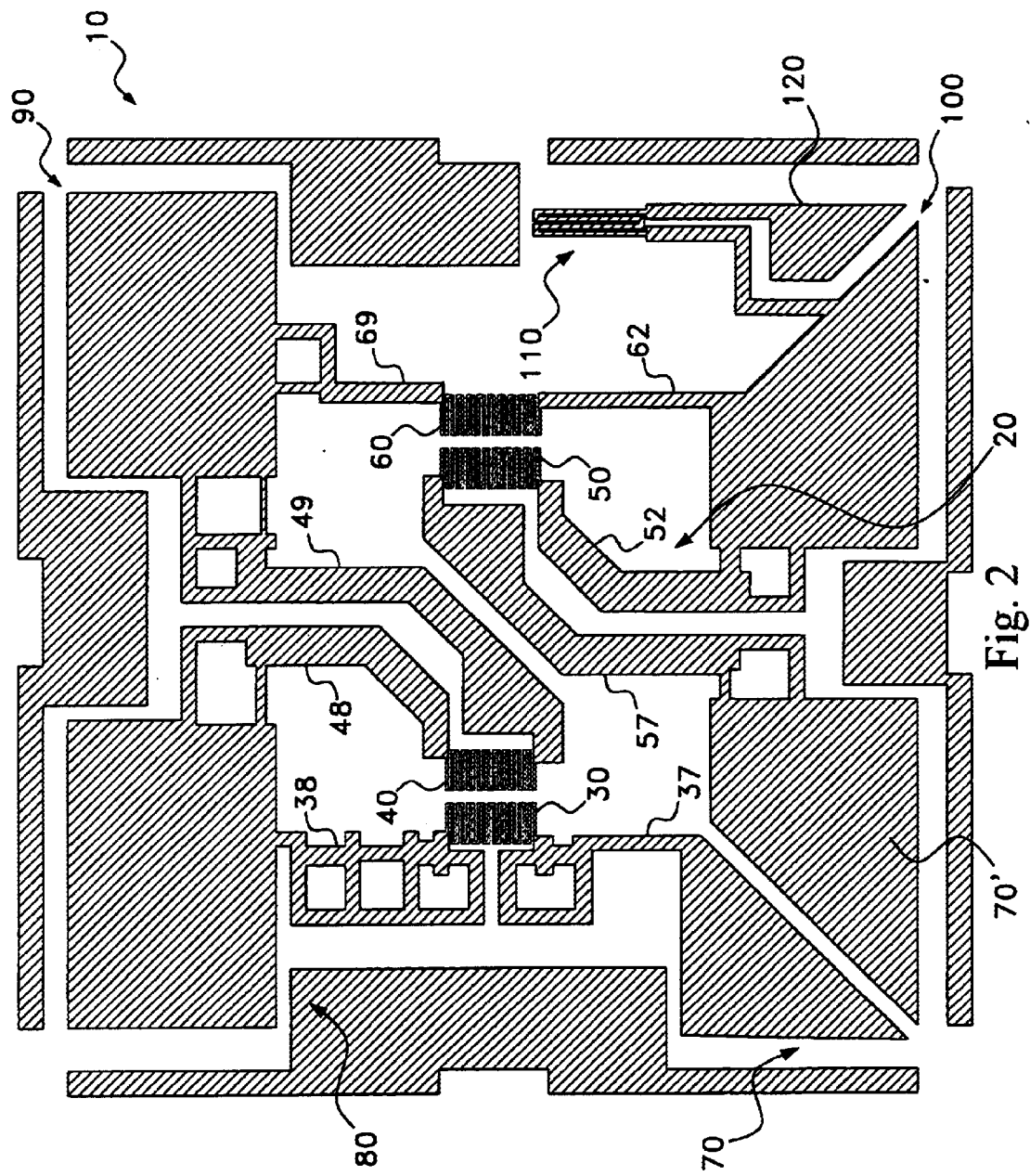
FIG. 2 illustrates a plan view of a dielectrically isolated sensor structure according to the present invention.

Referring now to FIGS. 2–5, like references identify like elements of the invention. FIG. 2 illustrates a plan view of a dielectrically isolated bridge sensor circuit structure 10 formed on a silicon wafer according to the present invention. The structure 10 can be preferably formed in accordance with the teachings commonly assigned U.S. Pat. No. 5,286,671, entitled, "Fusion bonding technique for use in fabricating semiconductor devices" the entire disclosure of which is also incorporated by reference as if being set forth in its entirety herein. The structure 10 includes in the preferred embodiment, a deflectable diaphragm 20 having piezoresistors 30, 40, 50 and 60 electrically coupled in a Wheatstone Bridge configuration formed on or therein. Piezoresistors 30, 60 each decrease with positive normal stress and piezoresistors 40, 50 each increase with positive normal stress in response to deflection of the diaphragm 20 as is well known. The piezoresistors 30, 40, 50, 60 are preferably formed of highly doped P+silicon. It is understood that a number of such sensors can be made at the same time on a large substrate. The circuit nodes of the Wheatstone bridge include four oversized P+ silicon electrical contact areas or fingers 70, 70', 80, 90, 100 which are mainly located in non-active areas of the wafer 5. It should be understood the active portions of the wafer can be defined as that portion defined by the diaphragm 20, as this portion deflects in response to an applied pressure as is well known. The remaining portions are referred to as the non-active regions. The term "finger" is used to indicate those areas 70, 70', 80, 90, 100 which project from the piezoresistors 30, 40, 50, 60. The areas 70, 70', 80, 90, 100 are further adapted to be used as bonding pads to electrically couple to the structure 10. The structure 10 further includes on-chip resistor 110 electrically coupled between bonding pad 100 and bonding pad 120. Bonding pad 70' can be shorted to pad 70 to form a full bridge configuration using the piezoresistos 30, 40, 50, 60.

The wafer 100 is preferably fabricated using the method disclosed in commonly assigned U.S. Pat. No. 5,286,671 entitled "Diffusion Enhanced Fusion Bonding", the entire disclosure of which is also hereby incorporated by reference as if being set forth herein in its entirety. Alternatively, any conventional wafer processing technique which enables dielectically isolated piezoresistive sensor elements 30, 40, 50, 60 to be formed on semiconductor material using dielectric films of $SiO_2$ or the like could be used.

Figure 3:
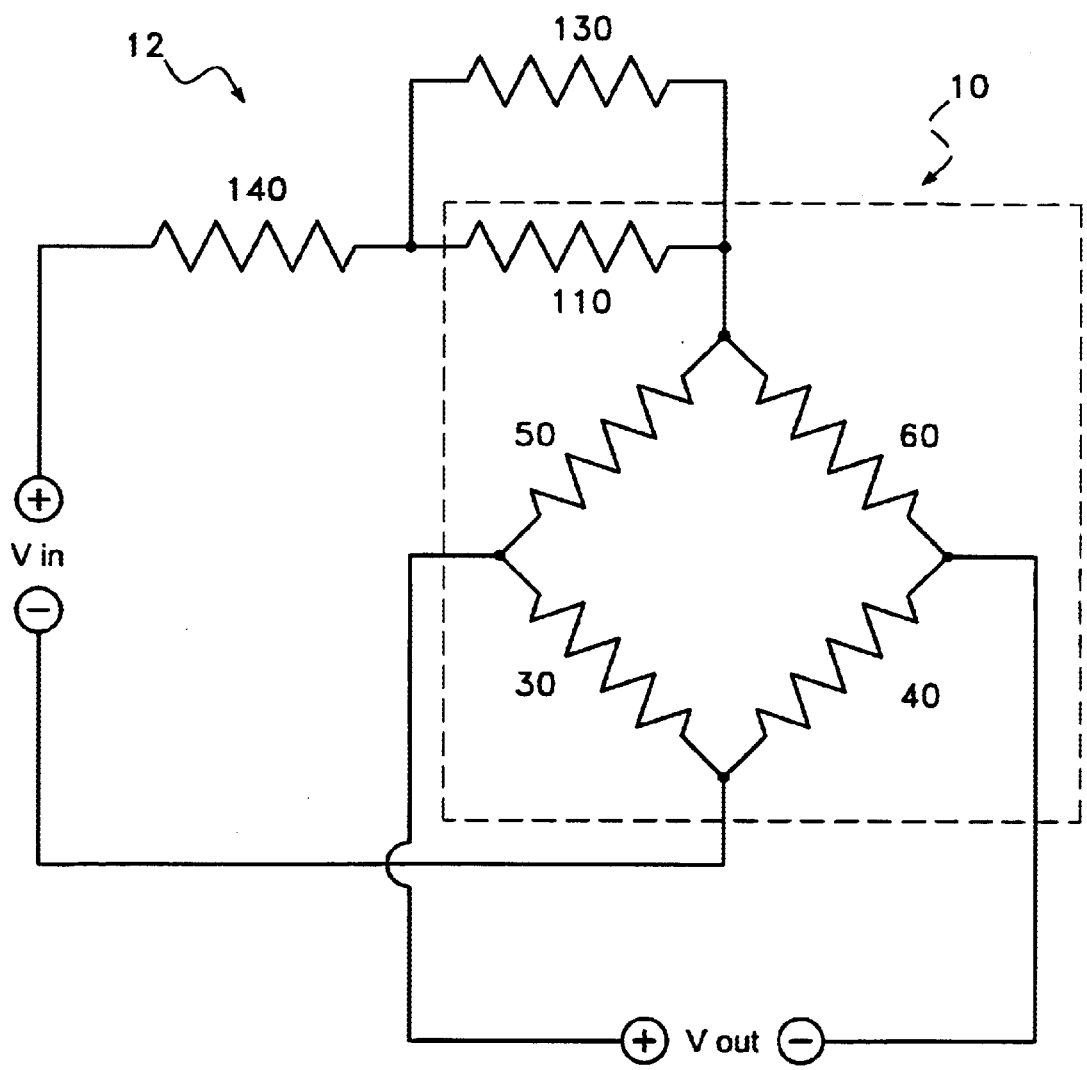
FIG. 3 illustrates an electrical representation of the present invention.

Referring now also to FIG. 3, therein is illustrated an electrical equivalence of the sensor circuit structure 10 incorporated into a sensor system 12. The system 12 includes the sensor circuit structure 10, an off-chip shunt resistor 130 coupled in parallel across on-chip resistor 110 and off-chip span resistor 140 coupled in series with the structure 10. Basically, the structure 10 is electrically coupled to an excitation voltage $V_{in}$ through serially coupled resistor 140 using pads 120 and 80. An output voltage $V_{out}$ is measured using the pads 70 and 90.

Figure 4:
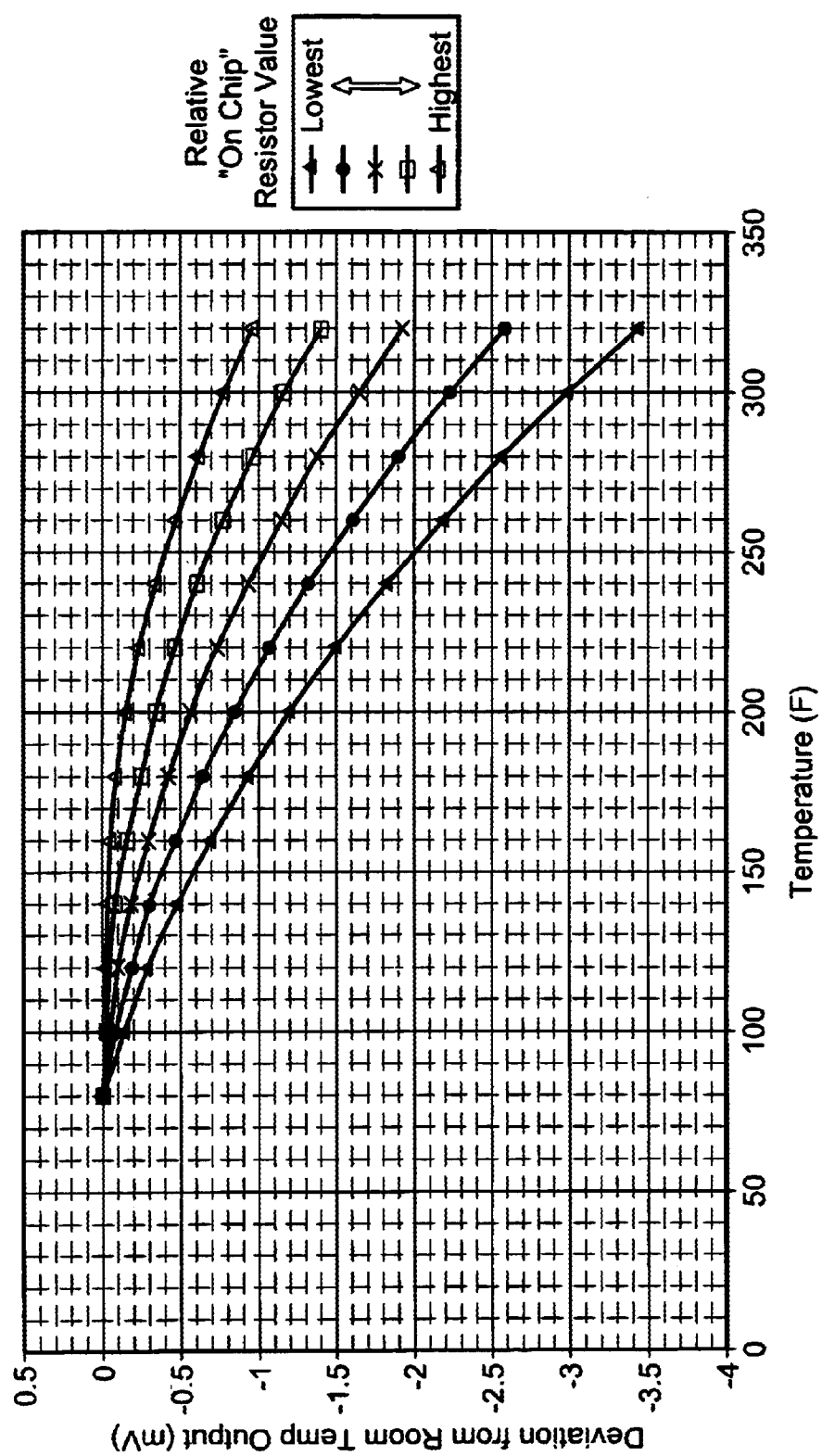
FIG. 4 illustrates the potential output characteristics of a pressure transducer versus temperature according to the present invention, depending upon the magnitude of the on-chip resistor.

Referring now also to FIG. 4, one can easily ascertain that by adjusting the value or resistance of on-chip resistor 110, it is possible to shift either end of the temperature range over which the device is operable up or down. This shift sacrifices the other end of the range, however this is often time acceptable because the same precision is not required at both ends of the temperature range. It is also easy to ascertain that by changing the ratio of the on-chip resistor 110 to that of the shunting resistor 130, similar adjustments may be made.

Figure 5:
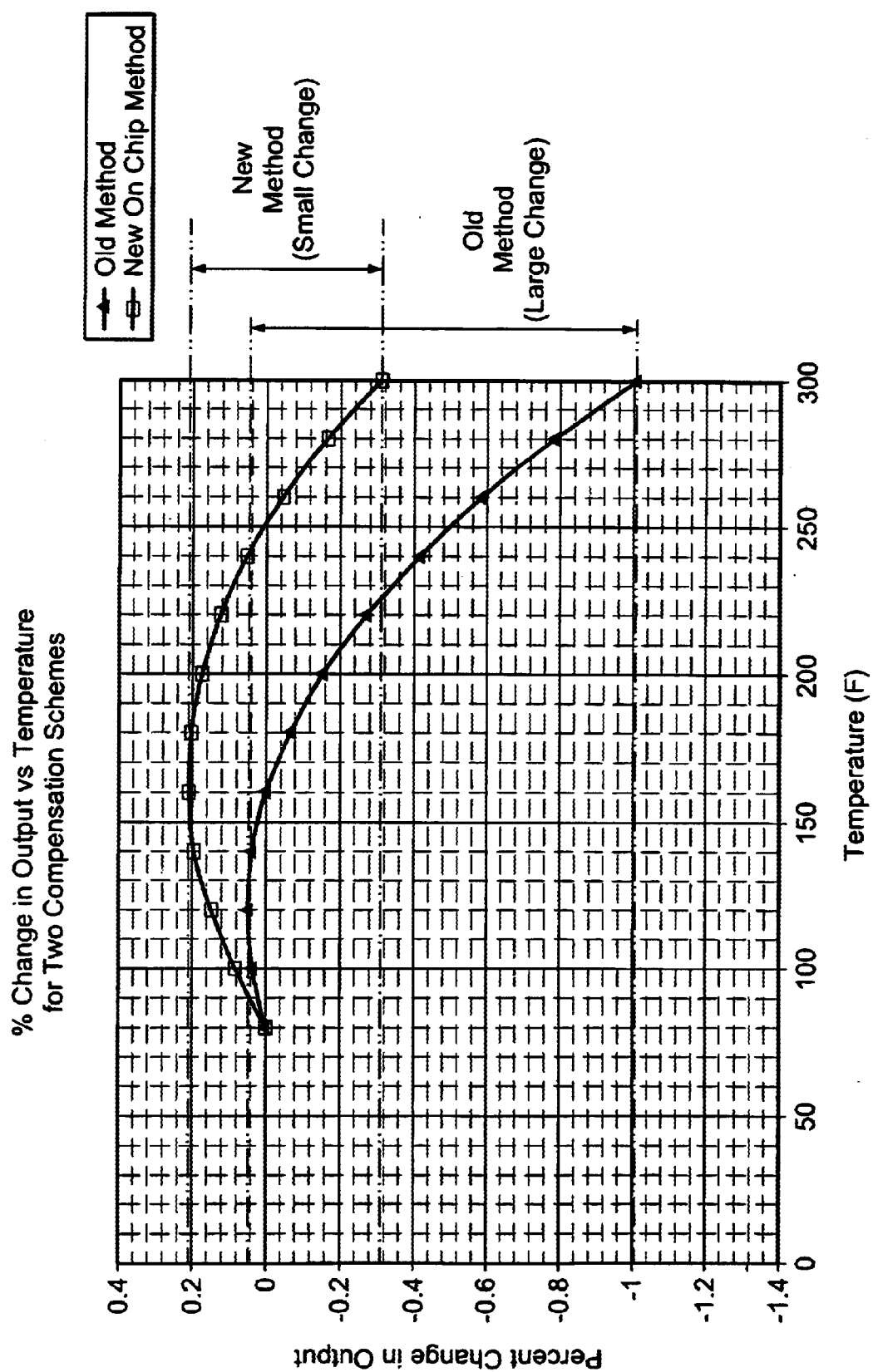
FIG. 5 illustrates the advantage gained utilizing the invention, compared to the standard methodology.

Referring now also to FIG. 5, it illustrates that while conventional passive resistor compensation techniques can give values near zero percent for a temperature range of −40° F. to 200° F., when the temperature to which the transducer is exposed rises above this, the method and device according to the present invention can be advantageously used. Further, the present method and device enables for overall smoothing of the performance curve of the Wheatstone Bridge output $V_{in}$ as is clearly illustrated in FIG. 5.

This new on chip compensation scheme is not meant to replace all traditional compensation schemes, instead it is meant to enhance some in certain circumstances. Namely when there is a very tight specification at either end of the temperature range.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

We claim:

1. A dielectrically isolated temperature compensated pressure transducer comprising:

a wafer including a deflectable diaphragm formed therein, said diaphragm being capable of deflecting in response to n applied pressure, and said diaphragm defining an active region surrounded by an inactive region of said wafer;

a plurality of dielectrically isolated piezoresistive elements formed on said active region of said wafer and coupled together to form a Wheatstone bridge configuration so as to cooperatively provide an output signal in response to and indicative of an amount of deflection of said diaphragm, said output signal including an error caused by exposure of said wafer to an environmental condition; and a dielectrically isolated resistor formed on said inactive region of said wafer and a second resistor coupled in parallel across said resistor to shunt said resistor, said resistor having a temperature coefficient of resistance characterized by a resistance that changes with unit changes in temperature, said second resistor having a temperature coefficient of resistance of substantially zero within an operating temperature range of said transducer, said shunted resistor electrically coupled in series with said Wheatstone bridge configuration of piezoresistive elements to selectively compensate for said error.

2. The transducer of claim 1, further comprising a third resistor coupled in series with said plurality of piezoresistive elements.

3. The transducer of claim 2, wherein $$\frac{V_{out}}{V_{in}} = \left(\frac{V_{out}}{V_{in}}\right)_{OLD} \frac{R_{bridge}(R_{shunt} + R_{OnChip})}{R_{shunt}R_{bridge} + R_{OnChip}R_{bridge} + R_{span}R_{shunt} + R_{span}R_{OnChip} + R_{shunt}R_{OnChip}},$$

Vout is an output voltage from said transducer, Vin is an excitation voltage of said transducer, $(V_{out}/V_{in})_{OLD}$ is the transducer's pre-temperature compensated sensitivity, $R_{bridge}$ is the resulting resistance of said plurality of piezoresistive devices in response to said applied pressure, $R_{shunt}$ is the resistance of said second resistor, $R_{OnChip}$ is the resistance of said resistor and $R_{span}$ is the resistance of said third resistor.

4. The transducer of claim 1, wherein each of said plurality of piezoresistors has a substantially same temperature coefficient of resistance.

5. The transducer of claim 4, wherein said Wheatstone bridge configuration includes two open arms.

6. The transducer of claim 5, wherein a temperature coefficient of resistance of said resistor is substantially the same as that of each of said arms of Wheatstone bridge.

7. A temperature compensated pressure transducer comprising:
 a wafer including a deflectable diaphragm which defines an active region of said wafer surrounded by an inactive region of said wafer;
 a plurality of piezoresistors formed on said active region of said wafer and coupled in a Wheatstone bridge configuration so as to generate a signal including a first portion indicative of an amount of deflection of said deflectable diaphragm and a second portion indicative of a temperature of said Wheatstone bridge;
 a resistor formed on said inactive region of said wafer and electrically coupled in series with said Wheatstone bridge to achieve a selected amount of compensation for said second portion of said signal, said resistor having a temperature coefficient of resistance characterized by a resistance that changes with unit changes in temperature; and
 a second resistor coupled in parallel across said resistor to shunt said resistor, said second resistor having a temperature coefficient of resistance of substantially zero within an operating temperature range of said transducer.

8. The transducer of claim 7, further comprising a third resistor coupled in series with said plurality of piezoresistive elements.

9. The transducer of claim 8, wherein $$\frac{V_{out}}{V_{in}} = \left(\frac{V_{out}}{V_{in}}\right)_{OLD} \frac{R_{bridge}(R_{shunt} + R_{OnChip})}{R_{shunt}R_{bridge} + R_{OnChip}R_{bridge} + R_{span}R_{shunt} + R_{span}R_{OnChip} + R_{shunt}R_{OnChip}},$$

Vout is an output voltage from said transducer, Vin is an excitation voltage of said transducer, $(V_{out}/V_{in})_{OLD}$ is the transducers pre-sensitivity temperature compensated, $R_{bridge}$ is the resulting resistance of said plurality of piezoresistive devices in response to said applied pressure, $R_{shunt}$ is the resistance of said second resistor, $R_{OnChip}$ is the resistance of said resistor and $R_{span}$ is the resistance of said third resistor.

10. The transducer of claim 9, wherein each of said plurality of piezoresistors has a substantially same temperature coefficient of resistance.

11. The transducer of claim 10, wherein said Wheatstone bridge configuration includes two open arms.

12. The transducer of claim 10, wherein a temperature coefficient of resistance of said resistor is substantially the same as that of each of said arms of Wheatstone bridge.

13. A method for providing a temperature compensated pressure transducer comprising:
 providing a wafer having a deflectable diaphragm formed therein defining an active region which deflects in response to an applied pressure and an inactive region;
 forming a plurality of piezoresistive devices in a Wheatstone bridge configuration on said active region of said wafer such that said plurality of piezoresistive devices collectively provide an output indicative of said applied pressure and introduce an error into said output due to an environmental condition to which said plurality of piezoresitive devices are exposed;
 forming a first resistive device on said inactive region of said wafer in sufficient proximity to said piezoresistive devices such that it will also be exposed to said environmental condition, said first resistive device having a temperature coefficient of resistance characterized by a resistance that changes with unit changes in temperature;
 shunting said first resistive device with a second resistive device, said second resistive device having a temperature coefficient of resistance of substantially zero within an operating temperature range of said transducer; and
 electrically coupling said shunted first resistive device in series with said Wheatstone bridge configuration of piezoresistive devices to achieve a selected amount of compensation for said error.

14. A dielectrically isolated temperature compensated pressure transducer comprising:
 a wafer including a deflectable diaphragm formed therein, said diaphragm being adapted to deflect in response to an applied pressure and defining an active region and an inactive region of said wafer;
 a plurality of dielectrically isolated piezoresistive elements formed on said active region of said wafer and electrically coupled together in a Wheatstone bridge so as to cooperatively provide an output in response to and indicative of an amount of deflection of said diaphragm, said plurality of piezoresistive elements being predisposed to introduce an error into said output responsively to exposure to an environmental condition;
 a dielectrically isolated resistor formed on said inactive region of said wafer such that its resistance is independent of the deflection of the diaphragm, said piezoresistors and said resistor having a temperature coefficient of resistance characterized by resistances that change with unit changes in temperature;
 a second resistor coupled in parallel across said resistor to shunt said resistor, said second resistor having a temperature coefficient of resistance of substantially zero within an operating temperature range of said transducer; and a third temperature insensitive resistor coupled in series with said Wheatstone bridge and said resistor;

the values of said resistor, said second resistor and said third resistor relative to the resistance of the Wheatstone bridge piezoresistors, chosen such that the voltage across the Wheatstone bridge will change in a selected manner with respect to changes in temperature.

15. A temperature compensated pressure transducer comprising:

a dielectrically isolated sensor including a deflectable diaphragm which defines an active region and an inactive region;

a plurality of piezoresistors formed in a Wheatstone bridge configuration on said active region of said sensor so as to generate a signal indicative of an amount of deflection of said deflectable diaphragm;

an on-chip resistor formed on said inactive region of said sensor and electrically coupled in series with said Wheatstone bridge, said piezoresistors and said on-chip resistor having a temperature coefficient of resistance characterized by resistances that change with unit changes in temperature;

a second resistor coupled in parallel across said on-chip resistor to shunt said resistor, said second resistor having a temperature coefficient of resistance of substantially zero within an operating temperature range of said transducer; and a third resistor coupled in series with said plurality of piezoresistive elements and said shunted on-chip resistor, said resistance values of said resistors so chosen as to obtain a selected variation with temperature of voltage across the Wheatstone bridge.

16. A method for providing a temperature compensated pressure transducer comprising:

providing a dielectrically isolated sensor having a deflectable diaphragm formed therein defining an active region which deflects in response to an applied pressure and an inactive region;

forming a plurality of piezoresistive devices in a Wheatstone bridge configuration on said active region of said wafer such that said plurality of piezoresistive devices collectively provide an output indicative of said applied pressure and introduce an error into said output due to an environmental condition to which said plurality of piezoresistive devices are exposed;

forming a first resistive device of appropriate value on said inactive region of said sensor in sufficient proximity to said piezoresistive devices such that it will also be exposed to said environmental condition and such that said piezoresistive devices and said first resistive device have a temperature coefficient of resistance characterized by resistances that change with unit changes in temperature;

electrically coupling said first resistive device in series with said Wheatstone bridge configuration of piezoresistive devices;

shunting said first resistive device with a second resistive device, said second resistive device having a temperature coefficient of resistance of substantially zero within an operating temperature range of said transducer and chosen to give an appropriate temperature coefficient of resistance of the parallel combination of said first and second resistive devices to enhance the temperature compensation of the Wheatstone bridge; and coupling a third resistive device in series with said Wheatstone bridge configuration of piezoresistive devices and said first device, said resistance values of said resistive devices so chosen as to obtain a selected variation with temperature of voltage across the Wheatstone bridge.

* * * * *